March 26, 1963  L. RAYMOND  3,083,084
APPARATUS FOR TREATMENT OF EXHAUST GASES
Filed Oct. 6, 1960  2 Sheets-Sheet 1
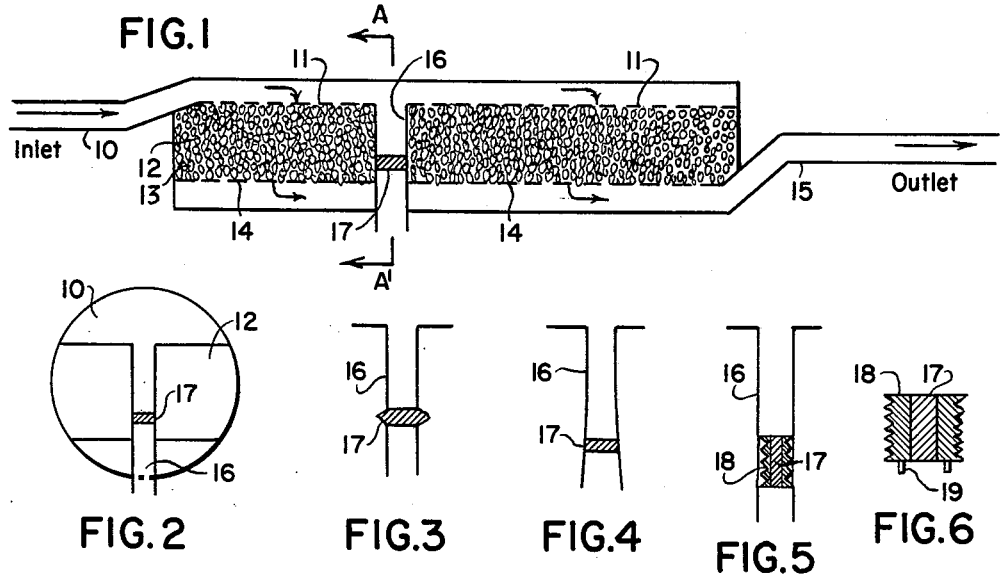
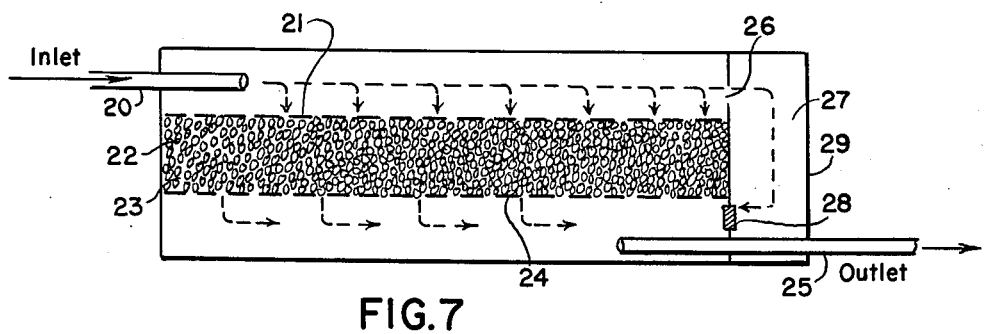
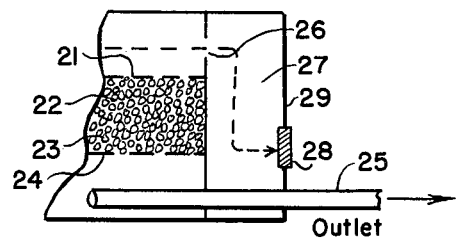
*INVENTOR.*
Leonard Raymond
ATTORNEY March 26, 1963     L. RAYMOND     3,083,084
APPARATUS FOR TREATMENT OF EXHAUST GASES
Filed Oct. 6, 1960     2 Sheets-Sheet 2

*INVENTOR.*
Leonard Raymond

ATTORNEY

3,083,084
APPARATUS FOR TREATMENT OF EXHAUST GASES

Leonard Raymond, New York, N.Y., assignor to Socony Mobil Oil Company, Inc., a corporation of New York
Filed Oct. 6, 1960, Ser. No. 61,091
5 Claims. (Cl. 23—288)

This invention relates to an improvement in catalytic treatment of exhaust gases of internal combustion engines. More particularly, the present invention is directed to a temperature responsive device affording means, under conditions of excessive temperature, for by-passing a catalytic converter affixed to the exhaust of an internal combustion engine.

The exhaust gases emitted by vehicles utilizing internal combustion engines of either the spark ignition or auto ignition type may contain considerable quantities of toxic and obnoxious fumes. Such fumes comprise unburned or partially burned hydrocarbons, particularly olefinic hydrocarbons, which react with nitrogen oxides and with oxygen under the influence of sunlight to produce pollutants which have a distinctive odor, are irritating to the mucous membranes, particularly of the eyes, and cause damage to certain species of plants. Of the toxic gases, carbon monoxide is one of the most deadly. Thus, amounts as small as 0.1 volume percent of carbon monoxide in the atmosphere is dangerous to life and lethal amounts can, without realization, be inhaled and combined with blood hemoglobin before its effects are evident. In areas of congested vehicular traffic where frequent stopping is necessary, the carbon monoxide contained in the exhaust gas of an average automobile ordinarily amounts to 4.5 percent by volume and may, at times, reach 9 percent by volume. Automobile and similar exhaust gases are also objectionable because of their malodorous constituents attributable to unburned fuel and oil and the decomposition products thereof.

It has heretofore been proposed to treat the above obnoxious and dangerous exhaust fumes by passage through a catalytic converter wherein the fumes are brought into contact with an oxidation catalyst and thereby undergo conversion. In such manner, carbon monoxide is converted to carbon dioxide and hydrocarbon constituents of the exhaust gas undergo oxidation to carbon dioxide and water.

The temperature of exhaust gas streams at the end of the engine exhaust manifold in commercial cars generally range from a temperature of about 450° F. when the engine is idle up to about 1100° F. at 50 miles per hour. Higher temperatures result from greater speeds.

With the attainment of such high temperatures, it is desirable that a catalytic converter be protected to prevent overheating the converter and catalyst contained in it, particularly under abnormal conditions of operation. Thus, if a spark plug should become fouled, unburned gasoline plus air would evolve from the cylinder and pass through the converter causing a very high temperature rise up to and above 2000° F.

As a protection against this condition, it is considered necessary to design and construct the exhaust system in such a manner that the exhaust gas will be diverted from the catalyst chamber in case of excessive temperature. The method that has been considered by the various workers in this field is the use of a thermal sensing element which activates two valves, a shut-off valve to the catalyst chamber and a by-pass valve around the catalyst chamber. This arrangement is complicated, costly and at times unreliable. The design of suitable valves that are inexpensive and trustworthy for such type operation has presented a formidable problem. Thus, dependable operation of a valve after a longer period of idleness on a car which has been exposed to the elements has provided a problem of economics and design.

In general, it has been desired to avoid exposure of the catalyst and converter to temperatures in excess of about 1600° F. since under such conditions, activity of the catalyst is jeopardized and the structure of the converter is susceptible to damage. In accordance with the present invention, such temperature conditions are avoided in the catalytic converter and catalyst bed by providing in combination therewith a by-pass conduit permitting the exhaust gas to circumvent the catalyst bed, which by-pass conduit is equipped with a temperature responsive device serving to effect closure of the by-pass conduit under conventional operating temperature conditions and comprising at least in part a fusible material normally solid under the aforesaid conditions but fusible below a predetermined temperature above which adverse thermal effects are encountered within the converter. Thus, should, under abnormal conditions of operation, excessively high temperatures develop which would tend to adversely affect the catalyst and converter, the same will cause the fusible material effecting closure of the by-pass conduit to melt and the exhaust gas will exit through said by-pass conduit, thereby avoiding subjecting the catalyst and converter to undesirable high temperature exposure. As soon as by-passing occurs, occupants of the car become aware of the condition because of the sudden increase in exhaust noise. After the condition causing the high temperature has been removed or remedied a new temperature responsive device is installed. The present device affords a simple, inexpensive and reliable means for overcoming the problem noted hereinabove.

In one embodiment, the present invention affords an improvement in a converter for catalytic treatment of internal combustion engine exhaust gas comprising an inlet conduit, a catalyst chamber, an oxidation catalyst contained within the chamber, and an outlet conduit wherein the exhaust gas passes through the inlet conduit to the catalyst chamber, undergoes oxidation therein in contact with the catalyst and passes from the chamber through the outlet conduit and where the converter and catalyst are susceptible under abnormal conditions of operation to adverse effects attributable to excessively high temperature. The improvement described herein comprises the provision of a by-pass conduit, affording means for circumventing the catalyst chamber and discharging the exhaust gas to the atmosphere, provided with a temperature responsive device which serves to effect closure of the by-pass conduit under conventional operating temperature conditions existent within the converter and comprises a fusible material normally solid under such conditions but fusible below a temperature encountered during abnormal conditions of operation and at which damage to the catalyst or exhaust system hardware would occur.

In another embodiment, the above desired by-passing of the exhaust gas under abnormally high conditions of temperature is accomplished by the provision of a fusible plug, linkage, or other member installed in the converter system adjacent to the catalyst chamber, exposed to the exhaust gas and capable of controlling the closure of a by-pass conduit which permits the exhaust gas to enter through the inlet conduit of the converter and to exit through the outlet conduit of the converter without substantial passage thereof through the catalyst chamber.

The invention will be more readily understood from a consideration of the accompanying drawings wherein:

FIG. 1 is a sectional elevation of an apparatus embodying, in one form, the improved converter system.

FIG. 2 is a cross section of the apparatus shown in FIG. 1 taken on line AA'.

FIGS. 3, 4, 5 and 6 illustrate modified forms of fusible plugs and means for affixing the same within a suitable by-pass conduit.

FIG. 7 is a sectional elevational view of another converter system embodying the improvement of the present invention.

FIGS. 8 and 9 illustrate modified forms of the apparatus shown in FIG. 7.

Figure 9:
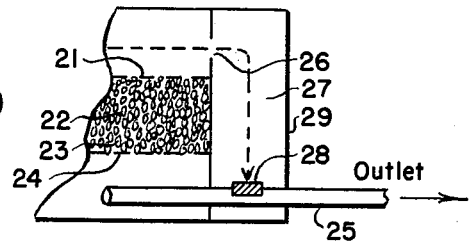

Turning now to FIGS. 1 and 2 exhaust gas, previously admixed with air by means not shown, is passed via inlet conduit 10 through perforated plate 11 and into catalyst chamber 12. An oxidation catalyst 13, suitably in particle form is contained in chamber 12 and serves to effect oxidation of oxidizable constituents of the exhaust gas which pass from the catalyst chamber through perforated plate 14 into outlet conduit 15 from which they are discharged to the atmosphere. With chamber 12 is positioned by-pass conduit 16 communicating directly with inlet conduit 10 and having spaced within the interior thereof a plug 17 of fusible material. If excessive abnormal temperature conditions arise within the catalytic converter which would tend to deactivate the catalyst or damage the structure of the converter, the fusible replaceable plug 17 melts at a predetermined temperature below the foregoing detrimental temperature and thus serves to conduct the exhaust gas directly to the atmosphere and to protect the catalyst and converter from thermal deterioration. After such conditions have been corrected, a new fusible plug is inserted in the by-pass conduit.

In FIG. 3, the fusible plug 17 is wedged into recessed openings within conduit 16. In the embodiment shown in FIG. 4, the by-pass conduit is tapered with a gradually increasing diameter as it extends from the converter so that the plug readily engages the walls of conduit 16. In FIG. 5 the walls of conduit 16 are suitably interiorly threaded to engage a threaded member 18 surrounding the fusible plug or core 17. In FIG. 6, the threaded member 18 is shown with interior fusible plug 17 and provided with lugs 19 which afford convenient means for screwing and unscrewing the threaded member 18 into the interior of conduit 16.

Referring now to the embodiment shown in FIG. 7, exhaust gas mixed with air is passed through inlet conduit 20 through perforated plate 21 and into catalyst chamber 22. An oxidation catalyst 23 is contained in the form of particles in chamber 22 and serves to oxidize constituents of the exhaust gas which pass from the catalyst chamber through perforated plate 24 into outlet conduit 25 from which they are discharged to the atmosphere. Adjacent the catalyst chamber and in communication therewith via passageway 26 is end chamber 27 having one wall thereof proximate the catalyst chamber provided with a fusible replaceable plug 28. Before attainment of an abnormal excessively high predetermined temperature in the catalytic converter which would damage the catalyst or the structure of the converter, the fusible plug 28 melts and provides a by-pass for the exhaust gas to be discharged through outlet conduit 25 in accordance with a line of least resistance rather than flow through the catalyst bed wherein greater resistance to gas flow is encountered. The catalyst and converter are thus protected from damage. After conditions causing the high temperature have been corrected, a new fusible plug is readily installed through removable end plate 29.

In the alternate forms shown in FIGS. 8 and 9, the fusible plug is positioned respectively in end plate 29 and in outlet conduit 25. Operation is otherwise identical with that of the apparatus of FIG. 7.

Figure 10:
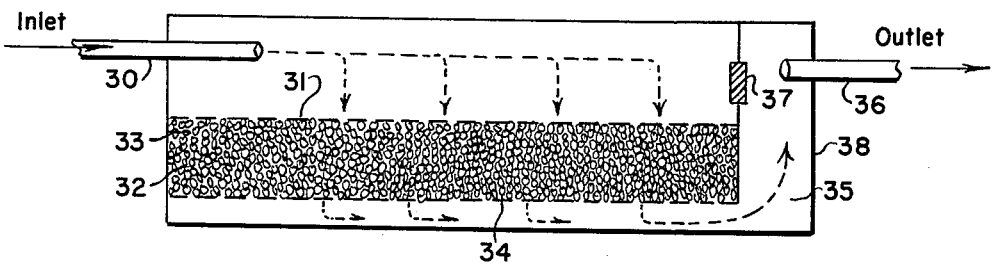
FIG. 10 depicts another improved converter system embodying the invention.

In the modification shown in FIG. 10, exhaust gas mixed with air passes through inlet conduit 30 through perforated plate 31 and into catalyst chamber 32 containing an oxidation catalyst 33 in particle form. The oxidized constituents of the exhaust gas pass from the catalyst chamber through perforated plate 34 into adjacent end chamber 35 and then into outlet conduit 36 through which they are discharged to the atmosphere. Adjacent the catalyst chamber and in substantial horizontal line with the inlet and outlet conduits, there is provided in one wall of end chamber 35 proximate the catalyst chamber, a fusible replaceable plug 37, which, as in the previous embodiments, melts under abnormal conditions of operation at a predetermined temperature below that at which damage to the catalyst or converter would take place due to the development of an excessively high temperature. After correction of conditions which cause the undesired high temperature, a new fusible plug may be installed by removal of end plate 38.

Figure 11:
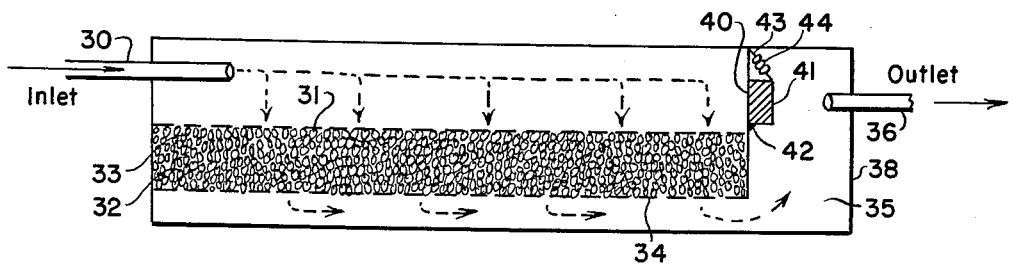
FIG. 11 shows still another alternate form of the invention.

The embodiment shown in FIG. 11 is similar to that depicted in FIG. 10 except that in place of the fusible plug, there is provided a passageway 40, which under normal operating temperature conditions is closed by plate 41 affixed at its lower edge with a hinge or similar fastening means 42 to the outer wall of the catalyst chamber. The plate 41 is maintained in a closed position by means of line 43 one end of which is attached to the upper portion of plate 41 and the other end of which is affixed to the inner wall of end chamber 35 as shown. Intermediate the ends of said line 43 is placed a fusible link 44 composed of material which melts at a predetermined temperature below the temperature which would adversely affect or damage the catalyst or converter. Upon fusion of link 44, line 43 breaks and plate 41 falls open on its hinge 42 as a result of gravity permitting the passage of exhaust gas directly through the converter without appreciable flow thereof through the catalyst bed. The catalyst, as well as the converter hardware is thereby protected from thermal deterioration attributable to the development of abnormally high temperatures. After correction of the condition causing the high temperature, the fusible link 44 may be replaced by suitable removal and replacement of end plate 38.

The by-pass provided with a fusible plug or link may, as shown, be located near the center of the catalyst bed or at the end thereof proximate the outlet conduit so that the by-pass would open upon reaching a predetermined temperature in the converter. Alternately, the by-pass may be installed prior to the converter to operate when excessively high temperatures are encountered.

The inlet, by-pass and outlet conduits, as well as the catalyst chamber, may be of any conventional shape and generally are circular or cylindrical. The conduits and chamber are ordinarily constructed of iron or steel. While the invention is not concerned with the use of any particular catalyst, a number of oxidizing catalysts suitable for use in converting carbon monoxide to dioxide or for oxidizing hydrocarbon gases are well known. Because of the high water vapor content in internal combustion exhaust gas, the catalyst should be maintained during use above the boiling point of water, to prevent condensation of moisture on it. Highly active catalysts suitable for use include nickel or cobalt oxides, manganese dioxide and ferric oxide when in catalytically active condition. It is generally, although not essential, to deposit the active catalyst on a suitable particle form temperature stable support, such as alumina or siliceous materials.

The fusible material may be any suitable material fusible at the predetermined maximum temperature above which it is not desired to subject the converter or catalyst. Such temperature will be dependent upon the type of converter utilized as well as the particular catalyst employed. It is generally preferred, however, that temperatures not exceeding about 1600° F. be encountered in the catalytic converter. Copper-containing alloys of different compositions, having different fusing points, are well known and a suitable composition is selected according to the maximum temperature at which it is desired to have the material melt. Thus, taking in consideration the aforenoted maximum temperature of 1600° F. suitable fusible materials include Bell metal, an alloy of 78 percent copper and 22 percent tin; bronze, an alloy of 67 percent copper and 33 percent tin; Muntz metal, an alloy of 60 percent copper and 40 percent zinc and solder, an alloy of varying copper and zinc contents within the approximate ranges of 33 to 58 percent copper and 42 to 67 percent zinc.

The improvement of the present invention affords an inexpensive, dependable, and easily replaceable device capable of providing protection against adverse thermal effects to the catalytic converter and catalyst contained therein.

I claim:

1. In a converter for catalytic treatment of internal combustion engine exhaust gas comprising an inlet conduit, a catalyst chamber, an oxidation catalyst contained within said chamber, and an outlet conduit wherein said exhaust gas passes through said inlet conduit to said catalyst chamber, undergoes oxidation therein in contact with said catalyst and passes from said chamber through said outlet conduit and where said converter and catalyst are susceptible under abnormal conditions of operation to adverse effects attributable to excessively high temperature, the provision of a by-pass conduit for circumventing said catalyst chamber and discharging said exhaust gas to the atmosphere equipped with a temperature responsive device serving to effect closure of said by-pass conduit under conventional operating temperature conditions existent within said converter and comprising a fusible material normally solid under said conditions but fusible below a predetermined maximum temperature encountered during said abnormal conditions of operation and above which said adverse effects are prevalent.

2. In a converter for catalytic treatment of internal combustion engine exhaust gas comprising an inlet conduit, a catalyst chamber, an oxidation catalyst contained within said chamber, and an outlet conduit wherein said exhaust gas passes through said inlet conduit to said catalyst chamber, undergoes oxidation therein in contact with said catalyst and passes from said chamber through said outlet conduit and where said converter and catalyst are susceptible under abnormal conditions of operation to adverse effects attributable to excessively high temperature, the provision of a by-pass conduit for circumventing said catalyst chamber and discharging said exhaust gas to the atmosphere, provided with a plug effecting closure of said conduit and consisting of a material normally solid under conventional operating temperature conditions existent within said converter but fusible below a predetermined maximum temperature encountered during said abnormal conditions of operation and above which said adverse effects are prevalent.

3. In combination with a catalytic converter for purification of internal combustion engine exhaust gas wherein said gas is brought into contact with a bed of oxidation catalyst, a by-pass conduit permitting said exhaust gas to circumvent said catalyst bed provided with a temperature responsive device serving to effect closure of said by-pass conduit under conventional operating temperature conditions and comprising, at least in part, a fusible material normally solid under said conditions but fusible below a predetermined temperature above which adverse thermal effects are encountered within said converter.

4. A catalytic converter for treatment of the exhaust gas of motor vehicles to remove obnoxious and toxic constituents therefrom which comprises an inlet conduit, a catalyst chamber, oxidation catalyst contained within said chamber, an outlet conduit and a by-pass conduit, the latter affording means for discharging said gas to the atmosphere in the event of occurrence of excessive temperature conditions giving rise to adverse effects in said converter, said by-pass conduit being provided with a closure plug of normally solid material fusible below a predetermined temperature above which said adverse effects are encountered.

5. In combination with a catalytic converter for purification of internal combustion engine exhaust gas wherein said gas is brought into contact with a bed of oxidation catalyst, a by-pass conduit permitting said exhaust gas to circumvent said catalyst bed provided with a temperature control device serving to effect closure of said by-pass conduit under conventional operating temperature conditions and comprising a member responsive to said closure composed of a material normally solid under said conditions but fusible below a predetermined temperature above which adverse thermal effects are encountered within said converter.

References Cited in the file of this patent

UNITED STATES PATENTS

| | | |
|---|---|---|
| 1,415,418 | Wachtel | May 9, 1922 |
| 1,444,661 | Clifford | Feb. 6, 1923 |
| 1,699,244 | Lewis | Jan. 15, 1929 |
| 1,701,805 | Dunn | Feb. 12, 1929 |
| 2,729,221 | Gorham et al. | Jan. 3, 1956 |
| 2,937,490 | Calvert | May 24, 1960 |
| 2,991,160 | Claussen | July 4, 1961 |